(No Model.)

A. R. KNAPP.
GAME COUNTER.

No. 583,487. Patented June 1, 1897.

Witnesses.
Edward J. Blake
George F. Gosney

Inventor:
Alfred Robert Knapp,
per
John Pitt Bayly.
Attorney.

UNITED STATES PATENT OFFICE.

ALFRED ROBERT KNAPP, OF CREWKERNE, ENGLAND.

GAME-COUNTER.

SPECIFICATION forming part of Letters Patent No. 583,487, dated June 1, 1897.

Application filed June 25, 1896. Serial No. 597,494. (No model.) Patented in England January 3, 1896, No. 4,116; in Germany January 15, 1896, No. 87,610, and in France April 18, 1896, No. 255,647.

*To all whom it may concern:*

Be it known that I, ALFRED ROBERT KNAPP, stationer, a subject of the Queen of Great Britain, residing at Crewkerne, in the county of Somerset, England, have invented a new and useful Improved Marker for Games, Applicable to Bezique, Cribbage, Whist, and the Like, (for which I have obtained a patent in Great Britain, No. 4,116, dated January 3, 1896; in Germany, No. 87,610, dated January 15, 1896, and in France, No. 255,647, dated April 18, 1896,) of which the following is a specification.

My invention relates to an improved marker for games, applicable to bezique, cribbage, whist, and the like. I attain these objects by the mechanism illustrated in the accompanying drawings, in which—

Figure 1:
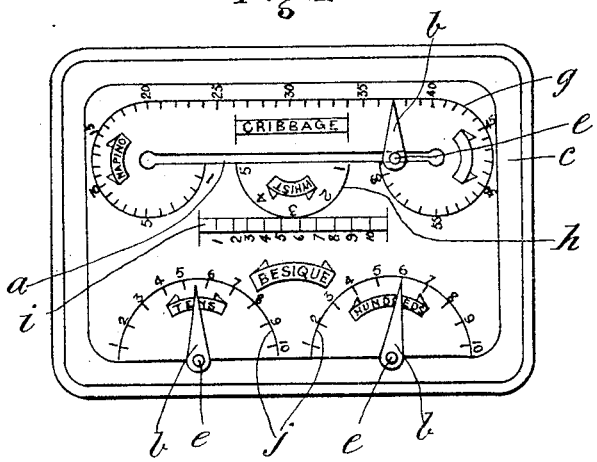
Figure 2:
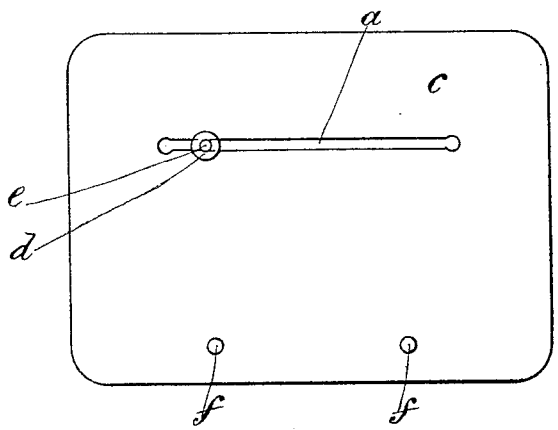

Figure 1 is a plan of the top or front side of the marker. Fig. 2 is a plan of the back of Fig. 1.

Similar letters refer to similar parts throughout both views.

This invention is constructed of mill-band or the like or metal with turned-over edges cut to a suitable shape to form the plate $c$, and in this said plate is cut a longitudinal slot $a$. The face of the plate $c$ is divided out into a scale $g$ at the top from "1" to "60" in the form of parts of two circles joined by a straight line, and below the slot is a semicircular scale $h$ from "1" to "5." In the longitudinal slot $a$ is mounted a movable pointer $b$, fixed to a center pin $e$ and a disk $d$. This said pointer can be placed in any desired position for indicating points on either of the scales. In the center of the plate $c$ is a straight scale $i$, and at or near the base-line are two semicircular scales $j$ from "1" to "10," each with a pointer $b$ in the center of each scale. These said pointers are attached to center pins $e$, which are forced through holes in the plate and clenched on the other side with heads $f$.

What I claim, and desire to secure by Letters Patent of the United States, is—

In a game-marker, the combination of a pasteboard plate with turned-over edges having a longitudinal slot, and the face of the plate divided out into a scale at the top from "1" to "60" in the form of parts of two circles joined by a straight line, and the semicircular scale "1" to "5," the two at or near the base-line "1" to "10" each with the straight scale in the center and the metallic movable pointers which are attached to center pins forced through holes and the slot in the plate and clenched at the back, substantially as described.

ALFRED ROBERT KNAPP.

Witnesses:
    EDWARD J. BLAKE,
    GEORGE F. GOSNEY.